United States Patent
Boneh et al.

(10) Patent No.: US 6,760,750 B1
(45) Date of Patent: Jul. 6, 2004

(54) SYSTEM AND METHOD OF MONITORING VIDEO AND/OR AUDIO CONFERENCING THROUGH A RAPID-UPDATE WEB SITE

(75) Inventors: Rami Y. Boneh, Rosh Haayin (IL); Danny Biby, Ramat-Gan (IL); Rivka Rotkovitch, Petach-Tikva (IL)

(73) Assignee: Polycom Israel, Ltd. (IL)

( * ) Notice: Subject to any disclaimer, the term of this patent is extended or adjusted under 35 U.S.C. 154(b) by 0 days.

(21) Appl. No.: 09/675,798

(22) Filed: Sep. 28, 2000

Related U.S. Application Data

(60) Provisional application No. 60/186,417, filed on Mar. 2, 2000, and provisional application No. 60/186,002, filed on Mar. 1, 2000.

(51) Int. Cl.[7] .............................................. G06F 15/16
(52) U.S. Cl. .................. 709/204; 709/224; 379/202.01; 379/204.01
(58) Field of Search .......................... 709/255, 204–205, 709/218, 224, 217; 348/14–20; 395/200.34, 200.47–200.49; 379/202.01, 204.01

(56) References Cited

U.S. PATENT DOCUMENTS

| | | | |
|---|---|---|---|
| 5,375,068 A | 12/1994 | Palmer et al. | 364/514 |
| 5,444,476 A | 8/1995 | Conway | 348/15 |
| 5,491,797 A | 2/1996 | Thompson et al. | 395/200.03 |
| 5,594,859 A | 1/1997 | Palmer et al. | 395/330 |
| 5,619,555 A * | 4/1997 | Fenton et al. | 379/88.11 |
| 5,675,512 A | 10/1997 | Ireton et al. | 364/514 |
| 5,801,756 A | 9/1998 | Iizawa | 348/16 |
| 5,821,985 A | 10/1998 | Iizawa | 348/15 |
| 5,835,129 A | 11/1998 | Kumar | 348/15 |
| 5,854,893 A | 12/1998 | Ludwig et al. | 395/200.34 |
| 5,884,039 A | 3/1999 | Ludwig et al. | 395/200.57 |
| 5,944,791 A * | 8/1999 | Scherpbier | 709/218 |
| 5,982,415 A | 11/1999 | Sakata | 348/17 |
| 5,990,931 A | 11/1999 | Nimri et al. | 348/15 |
| 5,991,276 A | 11/1999 | Yamamoto | 370/260 |
| 6,052,730 A | 4/2000 | Felciano et al. | |
| 6,092,074 A | 7/2000 | Rodkin et al. | |
| 6,122,661 A | 9/2000 | Stedman et al. | |
| 6,144,991 A * | 11/2000 | England | 709/205 |
| 6,148,068 A * | 11/2000 | Lowery et al. | 379/202.01 |
| 6,167,432 A * | 12/2000 | Jiang | 709/204 |
| 6,182,073 B1 * | 1/2001 | Kukkal | 707/10 |
| 6,226,792 B1 | 5/2001 | Goiffon et al. | |

(List continued on next page.)

*Primary Examiner*—David Wiley
*Assistant Examiner*—Phuoc Nguyen
(74) *Attorney, Agent, or Firm*—Wong, Cabello, Lutsch, Rutherford & Brucculeri, L.L.P.

(57) ABSTRACT

The operation and status of a system, such as a video/audio conferencing system, is monitored through the use of a web-based system. The system includes multiple client computer devices that interconnect with a web server. The web server is able to access the system to determine status changes, as well as to control the operation of the system. For operability across multiple platforms and technologies, the interface between the web server and the system is performed using a Microsoft Component Object Model ("COM") application. The web server also includes an ASP page constructed with a server script and one or more client scripts embedded or invoked from the server script. The server script is set up to operate in a looped configuration. Each pass through the loop of the server script, the system is queried to determine if a status change has occurred. If no change has occurred, the server script delays and then restarts the loop. If a change in status has occurred, the client script is updated to reflect the status change and the client script is downloaded to the client computer device. The client computer device includes a web browser that loads a split pane web site from the web server—one pane being visible and the other pane being invisible. The client script runs within the invisible pane and is generally constructed to update the visible pane to reflect the status change. Thus, the visible pane on the client computer system can be updated automatically and rapidly without requiring a user to perform any functions, such as actuating a refresh button.

19 Claims, 5 Drawing Sheets

U.S. PATENT DOCUMENTS 6,230,171 B1 * 5/2001 Pacifici et al. .............. 707/512
6,295,551 B1 * 9/2001 Roberts et al. ............. 709/205
6,298,356 B1 * 10/2001 Jawahar et al. ............... 707/10
6,304,648 B1 * 10/2001 Chang ................... 379/202.01
6,317,777 B1 * 11/2001 Skarbo et al. .............. 709/203
6,393,424 B1 * 5/2002 Hallman et al. .............. 707/10
6,535,909 B1 * 3/2003 Rust .......................... 709/204

* cited by examiner

SYSTEM AND METHOD OF MONITORING VIDEO AND/OR AUDIO CONFERENCING THROUGH A RAPID-UPDATE WEB SITE

CROSS-REFERENCE TO RELATED APPLICATIONS

This application claims the benefit of U.S. Provisional Patent Application No. 60/186,417 filed Mar. 2, 2000. This application also claims the benefit of U.S. Provisional Patent Application No. 60/186,002 filed Mar. 1, 2000.

TECHNICAL FIELD

This invention relates to the field of Internet technologies and, more particularly, to the controlling and monitoring of video and/or audio conferencing through the Internet.

BACKGROUND

In the last several years, the World Wide Web, or the Internet, has been blended with a variety of other technologies to create new, innovative, and globally accessible applications. Such blended technologies include on-line airline reservation systems, weather monitoring systems, catalog purchasing, stock trading, as well as many others. An example of such a blended technology developed by Accord Telecommunications Ltd., now Polycom Israel Ltd., the assignee of the present invention, monitors and controls a video conference through the use of a website interface.

Utilizing existing technology to establish a video conference, a service provider is enlisted to reserve, set up, monitor and control the video conference. In this configuration, an operator must either attend the conference, monitor the conference, or at least be in contact via telephone, or some other means, with one of the participants of the video conference. The role of the operator is to monitor the video conference and resolve any problems that may arise. In addition, the operator can control various aspects of the video conference, such as, muting, video configurations, entrance and exits to the video conference, or the like. For example, if one of the participants in a video conference wants to mute another participant in the video conference, the initiating participant must notify the operator. The operator then mutes the other participant and provides an indicator to the other participants of such. Simple control over a video conference such as this requires the presence and attention of the operator.

The use of an operator within a video conference results in increasing the cost for video conferencing services. For each active video conference, sufficient operator support must be available. If a single operator is required to control multiple video conferences, the quality of service may suffer during busy or peak operational times. If a separate operator is assigned to each video conference to ensure a high-quality of performance, the cost of the video conferencing service may escalate.

In addition, in state of the art video conferencing technologies, the participants in a video conference may not be automatically made aware of the status of the video conference. For example, a participant may not know if another participant is joining into the conference or if a participant has muted himself via his or her terminal. In the current art video conferencing technologies, only the operator has access to such information. Thus, there is a need in the art for a system and method to allow individual participants in a video conference to obtain status information pertaining to the video conference and the other participants in the video conference. It is desirable to provide a solution which allows the individual participants in a video conference to control and/or obtain status information without requiring the intervention of an operator. The solution presented in the present invention is to utilize an Internet based monitoring and control system to replace some or all of the functions of the operator. Thus, there is a need in the art for a system and a method to blend video conferencing technology with Internet or network technology.

Often times, when blending existing technologies, short comings or incompatibilities arise that require innovative engineering to overcome. The use of a networked based monitoring and control system for video conferences encounters such incompatibilities. The most apparent incompatibility in the video conferencing example arises based on the need for continuously providing updated information to the participants of a video conference. The status information pertaining to a video conference can change rapidly and often. Obtaining and tracking this status information in real-time can be processor intensive. Thus, there is a need in the art for a system and method that can receive and rapidly process the status information available during a video conference.

Internet technologies were not developed for the purpose of providing and rapidly updating information. Rather, the Internet was designed to extract vast amounts of generally static information. Nonetheless, several attempts have been made to utilize the Internet in a manner to support monitoring or receiving information that is periodically updated, or more succinctly stated, to provide updateable web pages.

The most rudimentary technique to provide updateable web pages is the refresh function. Typically, state of the art web browsers are equipped with a function or button which, when invoked, will cause the browser to reload updated information from a displayed website. This process involves reloading the data from a web server without having any prior knowledge as to whether the data has changed or not. This technique is inadequate for many applications because it requires the viewer of the website to continuously invoke the refresh function to obtain updated information. If no new information is available, time and bandwidth are needlessly expended.

Another technique to provide updateable web pages is to automatically invoke the refresh function. This technique eliminates the requirement for the viewer to manually and continuously invoke the refresh button; however, similar to the previous technique, this automated technique is inadequate in that it wastes a significant amount of time and bandwidth. The refresh function is invoked blindly, because the viewer does not know if updated information is available or not. Thus, the refresh function may be invoked multiple times without providing any updated information. Therefore there is a need in the art for a system and a method to provide updated information in an Internet environment that minimizes the waste of time and bandwidth by only providing information when it has actually been updated or modified.

Another advanced technique for providing updateable web pages is to include a Java applet on the viewer's page. An applet invokes processing on the viewer's computer system. In operation, the applet opens a TCP/IP socket to the server in order to send and receive data from the server. Upon receiving the information from the server, the applet updates the web page with the new information. This technique for providing updateable web pages has several disadvantages. One such disadvantage is that this technique requires the opening of an additional TCP port on the firewall of the service provider. This opens the server to additional security risks. Another disadvantage is that large applets that include a significant amount of code take a substantial amount of time to load on the viewer's computer system. In addition, in some sites the browser does not support Java applets. Yet another disadvantage of this technique is that when transferring data using TCP/IP, the serialization and the de-serialization of the data has to be programmed (unless the server was written in Java). For instance, if the data received is a long string with delimiters, to parse the data and extract necessary information, code must be written to perform the task. However, the structure of the data would be known to a Java script.

Thus, there is a need in the art for a system and method to provide updateable web pages that are not limited to the use of Java applets. There is also a need in the art for such a system to be compatible with a variety of web page types and to quickly update.

Therefore, it is clear that there is a need in the art for a system and method to provide updateable web pages that reduce or eliminate above-described problems. There is also a need in the art for such a system and method that can be used for monitoring and controlling a video conference without the need for operator intervention.

Therefore, it is clear that there is a need in the art for a system and a method of monitoring video and/or audio conferencing through a rapid-update website.

SUMMARY OF THE INVENTION

The present invention includes a system and a method for updating a web page with rapidly changing information. Utilizing embodiments of the present invention, information can be updated with a delay of less than 500 ms. Although the present invention will be described within the context of monitoring and controlling a video conference through a website, those skilled in the art will appreciate that the present invention can be utilized within a variety of environments and is most beneficial in monitoring and controlling applications having fast changing data In general, the present invention satisfies the aforementioned needs in the art by providing a system and method to monitor and control a multi-participant video/audio conference using the web, and to rapidly update information on a web page to provide current status information to the participants of the conference. Conference scheduling and reservation via an Internet based web server instead of using an operator has been described in a separate provisional patent application titled "A System and Method for Providing Reservationless Conferencing" filed in the United States Patent Office on Mar. 1, 2000 by Accord Networks Ltd., and being assigned Ser. No. 60/186,002. Using the present invention, a participant can view the status of a video-conference on-line and control the operation of the video conference in semi-real time without contacting an operator.

One embodiment of the present invention includes a system for providing a semi real-time, automatically-updateable web page. The system includes a web server and a client computer device having a display. A server script runs in a continuous loop on the web server, receives data or status information from a data information source and generates a client script based, at least in part, on the data information. In one embodiment, the data is received from the information source by placing a call to a Microsoft Component Object Model ("COM") application running within the web server. The COM application interfaces to an external device and obtains the data or status information. If new data information is obtained from the COM application, the web server will create or modify the client script. The web server then downloads the client script to the client computer device.

The client computer device includes a web browser. The web browser enables the client computer device to interface with the web server through a network, such as the Internet, an intranet or any of a variety of networks. The web browser receives a Universal Resource Locator ("URL") that corresponds to a split web page to be downloaded from the web server. The split web page includes an invisible pane and a visible pane. The web browser receives the client script from the web server, into the invisible pane and executes the client script. One function of the client script is to update the visible pane, which is viewable on the display of the client computer device, with the data information received.

Another embodiment of the present invention includes a system for controlling the operation of a conference via a network. The conference is typically provisioned through a conference system controller or a Multipoint Control Unit ("MCU"). The system includes a web server and a client computer device. The web server includes a conference system controller interface to provide control information to the conference system controller and a network interface, typically to the Internet. The client computer device, which can be any computing device that includes a display, is communicatively coupled to the web server through the network interface. A web browser runs on the client computer device and is operative to receive a monitoring web page from the web server. The monitoring web page defines at least one control element which can be selected and/or actuated. When the control element is actuated, the web browser requests the web server to send a related control action to the conference system controller over the conference system controller interface.

In another embodiment, the web server includes a COM application and the web browser requests the web server to send a control action to the conference system controller by requesting the download of a command Microsoft's Active Server Pages ("ASP") page from the web server. The command ASP page includes a server script with a call to the COM application. Once the call to the COM application is placed, the COM application interfaces to the conference system controller over the conference system controller interface and performs the control action. The control action can include actions such as muting a participant, changing the display layout of a video conference, changing the zoom or pan of a participants camera, dropping a participant from the conference, or the like.

Thus, it will be seen by examining the figures, the detailed description associated with each figure, and the claims, that the present invention provides a useful, novel and non-obvious method for updating a web page with rapidly changing data and providing an Internet based solution for monitoring and controlling a video/audio conference.

DETAILED DESCRIPTION OF THE INVENTION

Turning now to the figures in which like numeral represent like elements throughout the several views, exemplary embodiments of the present invention are described.

Figure 1:
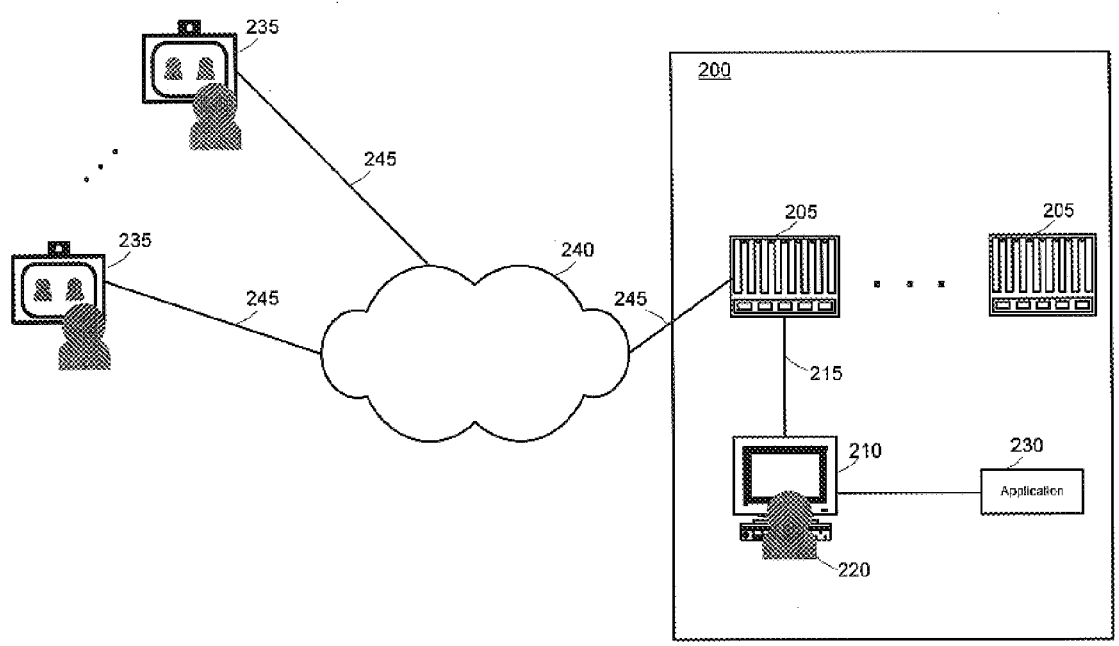
FIG. 1 is a system diagram illustrating a prior art system for monitoring and controlling a video conference using an operator.

FIG. 1 is a system diagram illustrating a prior art system for monitoring and controlling a video conference. A video conferencing service provider provides the resources and management necessary to provide video conferencing services to various parties. The resources of the service provider 200 includes one or more Multipoint Control Units ("MCU") 205 that interface with an operator console 210 over an MCU/operator-console interface 215. In this prior art system, an operator 220 is required for setting up, monitoring, providing status updates and tearing down video conferences.

The MCU 205 provides the central controlling functions, switching and routing for the video conferencing system. The MCU 205 manages the allocation of conferencing channels, processes the video, audio, control and data signals exchanged during a video conference and receives several channels from access ports. The MCU 205 is typically located in a node of a network, or in a terminal connected to the operator console via a network. However, the MCU 205 may also be co-located with the operator console 210 or the MCU 205 and the operator console 210 may even be integrated onto a single platform. It should be understood by those skilled in the art that the operations of the MCU 205 could be performed in a variety of configurations including hardware, software, or a hybrid of both hardware and software. According to certain criteria, the MCU processes audiovisual and data signals and distributes them to connected channels. An example of an MCU is the MGC-100 available from Polycom Israel Ltd., the assignee of the present invention. Additional information about the MGC-100 MCU can be obtained by accessing the Internet address of www.polycom.com.

In an exemplary embodiment, the MCU/operator-console interface 215 is implemented over a TCP/IP Internet connection; however, it should be understood that this interface can take on a variety of forms including any of a variety of wired, wireless, optical or networked connections.

An operator 220 controls and operates each MCU 205 through the use of the operator-console 210. The MCU 205 interfaces with multiple client terminals 235 through a network 240 which may include the Internet, an intranet, an ATM network, ISDN or any of a variety of interconnection means that provide sufficient bandwidth for bi-directional transmission of audio and/or video information. The MCU 205 and each client terminal 235 connects to the network 240 over a network access 245.

In a typical system, the MCU manager application 230 may be a Win32 application connected via a TCP/IP connection to the MCU 205. The Win32 application is an application that runs on a computer running one of the available Windows operating systems. A terminal 235 in this setting is an endpoint on a network, capable of providing real-time, two-way audio, visual and/or data communication with other terminals or an MCU 205. This communication consists of control signals, indicators, audio, and moving color video pictures and/or data between the two terminals. A terminal 235 may provide speech only, speech and data, speech and video, or speech, data and video. A more detailed definition of a terminal can be found in the ITU standards H.320, H.321 and H.323. In current state of the art systems, the MCU manager application 230 is used to enable the monitoring and control a video conference.

Figure 2:
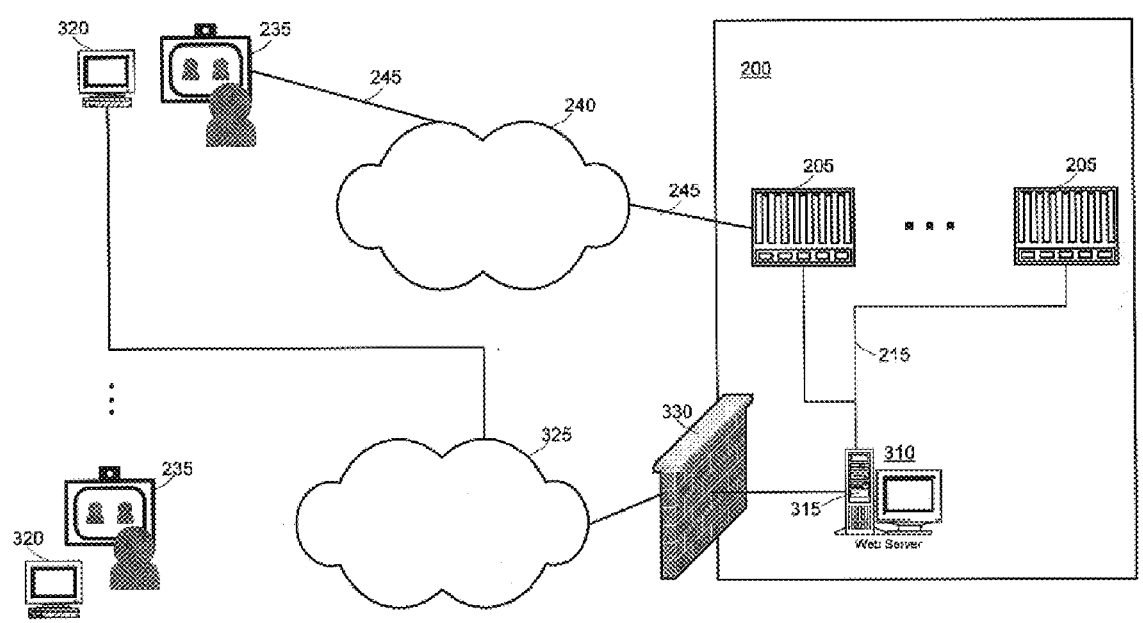
FIG. 2 is a system diagram illustrating an exemplary embodiment of the present invention utilized to control a video conference via a service provider controlled by a website.

FIG. 2 is a system diagram illustrating an exemplary embodiment of the present invention wherein a website is utilized to control a video conference via a service provider rather than an operator. In the exemplary embodiment of the present invention, monitoring and control of a video conference is performed through a web server 310 hosting a website 315. Every permitted participant in a video conference, or even permitted users that are not included in a video conference, can log into the web server 310 to monitor and control a video conference. One or more participants log into the web server 310 through the use of a web browser compatible computer device 320 connected to the web server 310 through a wide area network 325 such as the Internet, or a local area network, such as an intranet operating within an office building or the like. Once logged into the web server 310, the participant may monitor and control a video conference. The computer device 320 running the web browser can be synonymous to the participant terminals 235, or the computer device 320 can be a separate device such as a personal computer, hand held device, or the like. The computer devices 320, operating in conjunction with the web server 310 and the website 315, replace the operator 220, the operator console 210 and the MCU manager application 230 illustrated in FIG. 1.

In an exemplary embodiment, a Hyper Text Transfer Protocol ("HTTP"), used to send and receive data between web browsers and a web server, provides a connection between the web server 310 and the web browsers running on each participant's computer device 320. Typically, to provide some level of security, a firewall 330 will be used to control access to the Service Provider 200 LAN. A firewall is a system that protects a local area network that is connected to the Internet from unauthorized access. One embodiment of the present invention uses the HTTP port only which is usually open in most of the firewall Installation.

The system illustrated in FIG. 2 provides an exemplary environment for various embodiments of the present invention. One such embodiment of the present invention is to provide the ability to monitor and control a video conference from the participant's or the client computer device 320. The typical parameters of a video conference that can be controlled include, but are not limited to, muting, connecting and disconnecting participants, changing the conference video layout, changing the conference end-time, etc. The web browser running on the client computer device 320 shows the state of the conference. The conference state includes the number of connected participants, the participant's mute state, the video layout of the conference, etc. The data pertaining to this state of the conference is updated online. Utilizing the present invention, the delay associated with updating the conference state should be less than one second since the state of the conference changes rapidly. This update timing is similar to the timing available utilizing the MCU manager application 230 described in conjunction with FIG. 1.

One aspect of the present invention is providing a web page that can update rapidly without the need for a user to actuate a refresh button on the page or reload the page to obtain current status information. In an exemplary embodiment, the web server 310 is installed on an NT server running Microsoft's Internet Information Server ("IIS") version 4 or greater or Windows 2000 Server with IIS ver. 5.or greater. The web server 310 includes Microsoft's Active Server Pages ("ASP") written by Accord, HTML pages and an application with Microsoft's Component Object Model ("COM") interface. The application with the COM interface will be hereinafter referred to as the COM application.

Those skilled in the art will be aware that Microsoft's COM technology is a binary protocol used to communicate between software components. This technology enables an application (including a script file) to call functions within another application, even if the applications were written in different programming languages.

A basic Internet or intranet based website includes a server with an HTTP application and one or more web pages. A web page is a file that includes Hyper Text Markup Language ("HTML") formatted text content and/or graphic images. HTML is the basic system used for presenting information over the Internet. When a user enters the Internet address for a website, or a Universal Resource Locator ("URL") address, into a web browser, the Internet network locates the web server associated with the particular URL. A URL specifies the location and name of an Internet resource such as a website or an HTML web page. A web page at the entered URL is downloaded to the user's browser using the HTTP protocol. The browser interprets the HTML information and transforms and displays the downloaded data as a visual web page. The HTML based web page may include formatted text, pictures, graphics, push buttons and other simple Graphical User Interface ("GUI") components. The web page may also provide the ability for the user to enter and transmit data to the server hosting the web page. Those skilled in the art are familiar with HTML programming techniques, as well as web page and website construction techniques.

Along with the HTML information, a web page can include one or more client scripts. A client script is a program module that can be executed under the control of a browser in response to occurrence of particular events. For example, a web page can define an HTML push button to be displayed on the monitor of the client computer device 320 and that is associated with a client script. When the user actuates the push button (i.e., by moving the mouse cursor over the push button and pressing the left mouse button) the browser triggers the client script to run. The client script can, for example, change the push button color to indicate that the push button has been actuated or invoke a variety of events. There are a variety of coding languages that may be used to write a client script. One of the most popular languages is the Java script language which is supported by most browsers. Those skilled in the art will be very familiar with programming in Java script as well as other applicable programming languages.

Another common element in web page design is Microsoft Active Server Pages ("ASP"). Microsoft active server pages are web pages that may include, instead of or along with the above mentioned elements (HTML information and client scripts), a server script. A server script is a script running on the web server machine before a web page is downloaded to the client computer device 320. The server script dynamically builds the downloaded web page by acquiring necessary information or data and creating any necessary HTML information or client scripts. The server script can also obtain information by placing function calls to other applications running on the server, which have a Component Object Module ("COM") interface. The web page downloaded after the server script has executed includes only client elements (HTML, client script) that the client browser knows how to process. The use of ASP files is supported in Internet Information Servers ("IIS") of version 4 Microsoft HTTP servers. Those skilled in the art are familiar with ASP programming techniques.

The ASP files in the web server 310 call functions via the COM application located in the web server 310. The COM application may utilize a TCP/IP connection, or other connection, to communicate with the MCU 205 or any other external components. The monitoring application of the present invention may include a monitoring web page to display status information and control functions. The monitoring web page down loads to the client computer device 320 and is an HTML file split into two panes. One pane of the monitoring web page is hidden, having a zero size, while the other pane is visible. In the visible pane, there is an HTML file containing objects that can be changed, modified or updated with client scripts. These changeable objects include, but are not limited to, Graphics Interchange Formatted objects ("GIFs"), HTML edit boxes, or any other of a variety of updateable or changeable objects. Those skilled in the art will be aware that a GIF is a common format to send pictures over the Internet. The visible pane reflects the updated data or current information on the monitor of the client computer device 320.

The URL for the hidden pane is set to access an ASP file on the web server 310. The ASP file includes a server script with an embedded client script. Both scripts are embedded within an pseudo endless loop. The hidden pane is referred to as a Smart Page. The script in the Smart Page uses a COM interface to call functions in the COM application, especially a function to get the conference status data. If the status data for the conference changes between successive retrievals, the COM application returns the updated data. If the data of the conference has not change, then the COM application returns an indicator that the data has not changed. For instance, a zero, null or some other known data type may be used to indicate that the conference data has not changed.

In the event that there is new data, the client script is built in the Smart Page to reflect the updated data. The client script is downloaded to the participant's computer device 320 and is executed by the client browser operating on the participant's computer device 320. The client script updates the visible page with the new information. For example, a client script such as "ShowMutedIcon(false)" is downloaded to the participant computer device 320 if the party has been unmuted or the ShowMutedIcon(true) is downloaded if the party has been muted. At the end of the pseudo endless loop the server script goes inactive (i.e., sleeps) for about 0.5 seconds, and then the loop is repeated.

A benefit of this method is that within the same loop on the Smart Page, the server script runs on the web server 310 and the client script runs on the client computer device 320. The loop keeps an open connection between the web server 310 and the client computer device 320. When a change occurs, the web server downloads only the Updating Script and not the full page. Monitoring the conference without keeping the open connection, involves reloading (or refreshing) the hidden-client's page every so often (i.e., approximately every 0.5 sec in an exemplary embodiment but not limited to this time frame). This would have created a load on the HTTP connection, and degradation in performance of the web browser is very noticeable to a user when a page is downloaded so frequently.

Figure 3:
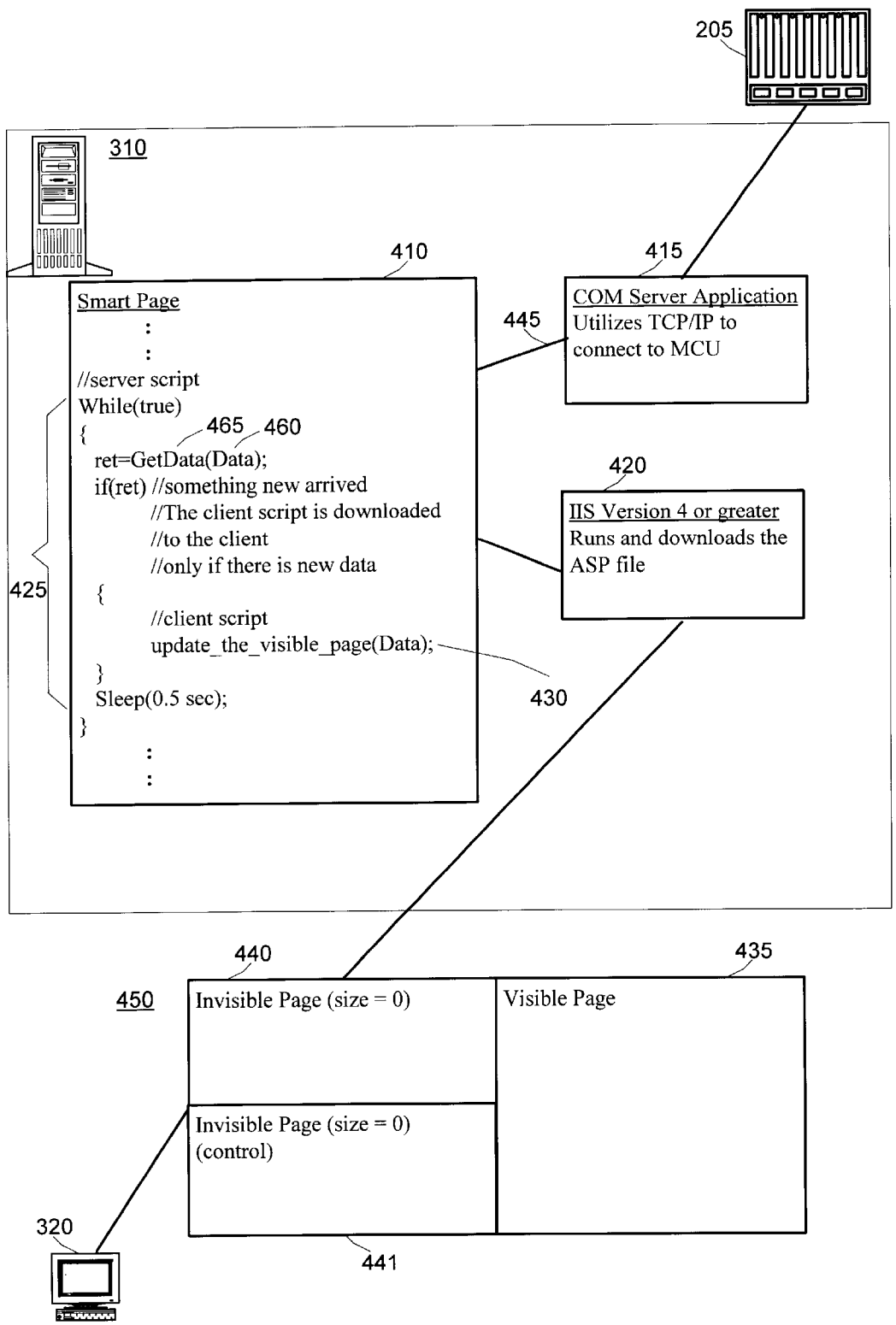
FIG. 3 is a block diagram of an exemplary embodiment of the present invention providing an updateable website.

FIG. 3 is a functional diagram illustrating the components of an exemplary embodiment of the present invention providing an updateable website. The web server 310 includes a Smart Page 410, a COM application 415 and runs HTTP Server 420 having Microsoft IIS version 4 or later. The code that is written on the Smart Page 410 is a pseudo code that has "C" language or Java like syntax. The Smart Page 410 includes server script code 425, that runs in the web server 310 and client script code 430 embedded within the server script code 425. The client script 430 in the illustrated example includes the line: update_the_visible_page, which is client code intended to run on the client computer device 325. The line update_the_visible_page is not a real piece of code but rather, it stands for one or more Java script lines that, when executed, operate to update the HTML on the visible pane 435 of the monitoring web page 440 being displayed by the client browser on client computer device 320. The client script 430 is built and downloaded to the client computer device 320 only if there is new data. When executed, the server script 425 places a call to a COM application (e.g., Get Data 465) and receives a response (e.g., Data 465). The response is typically a string or a string pointer to a series of Java script commands built by the COM application. The Smart Page 410 using a COM protocol 445, communicates with the COM application 415 to query the status of one or more devices or program modules. The COM application 415, in response to the query, accesses or determines the requested status and provides this information to the Smart Page 410. For example, if the Smart Page 410 requests status information from an MCU 205, the COM application 415 will communicate with the MCU 205 to obtain the requested status, and then provide the results to the Smart Page 410. The HTTP server (of Microsoft IIS version 4 or above) 420, runs the server script and, at the appropriate time, downloads the client script 430 to the client computer device 320.

The web browser running on the client computer device 320 includes a split web page 450 made up of an invisible pane 440 and a visible pane 435. The split web page 450 is downloaded to the web browser running on the client computer device 320 in response to a user entering the appropriate URL of the Smart Page 410. The client script 430, used to update the visible pane 435, is downloaded to the invisible pane 440. In an exemplary embodiment, a second invisible pane 441 may be used as the control section for entering commands and configuration information.

Figure 4:
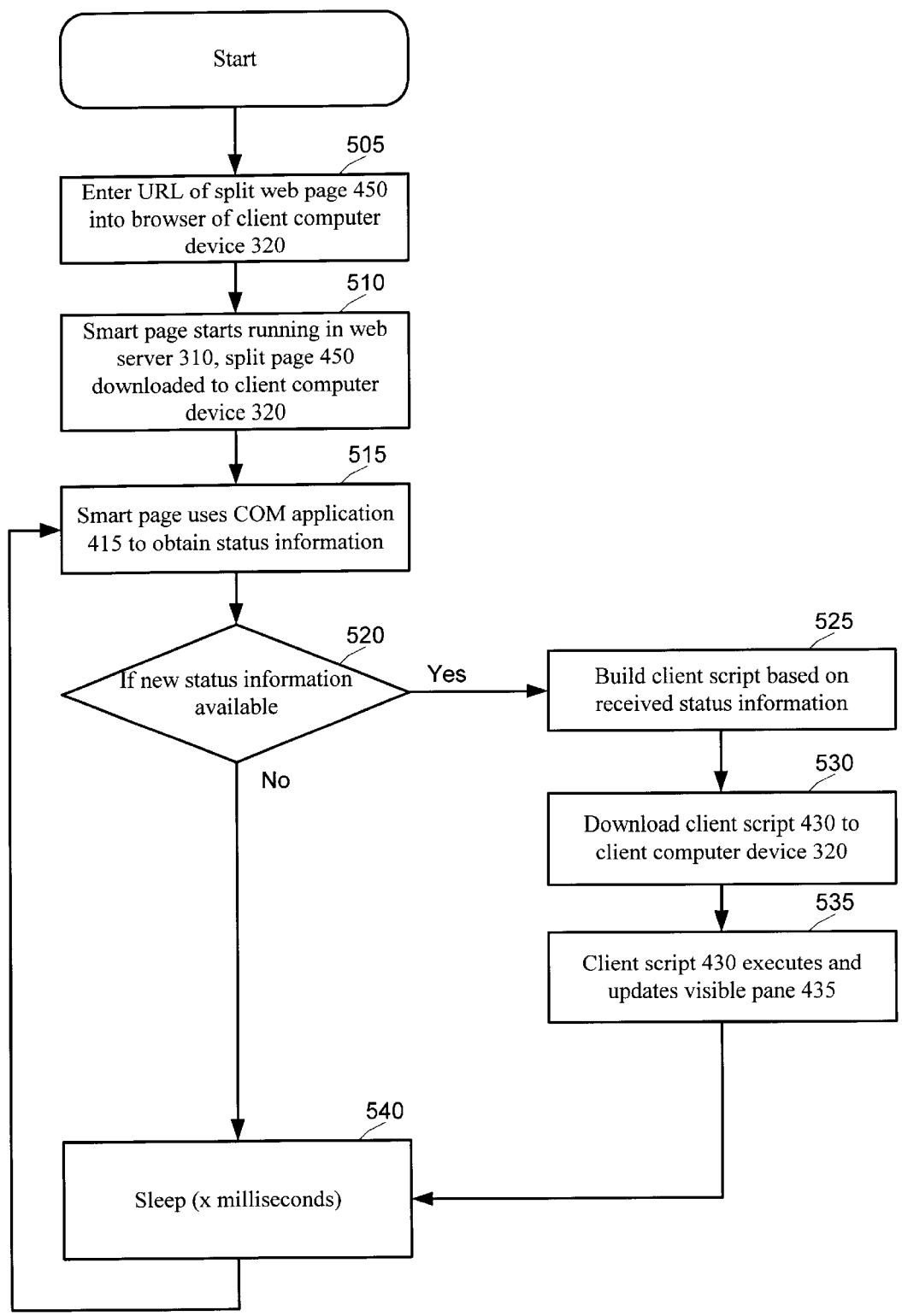
FIG. 4 is a flow diagram illustrating the steps of an exemplary embodiment of the present invention.

FIG. 4 is a flow diagram illustrating the steps of an exemplary embodiment of the present invention for monitoring a video conference event. Initially, participant A enters the URL of the split page or monitoring web page 450 into the browser on the client computer device 320 (505). As a result of entering the URL, the Smart Page 410 starts running the endless loop in the server 310 and the dual paned monitoring web page 450 is loaded onto the client computer device 320 (510).

In order to implement the updateable website of the present invention, several technical tasks must be accomplished. One such task is making the invisible page run in an endless loop. To create a loop running both on the web server 310 and on the client computer device 320, Java script tags should be placed inside the server script loop. One example of how to write such an ASP page follows. The server script is written in Visual Basic script and the client script in Java script.

```
>%
LoopLength =120
For j = 0 to LoopLength
    ret=COMObject.GetConfData(ConfData)
    if ret=1 then 'there is new data%>
    <script LANGUAGE="JavaScript">
        Update The ViewedPage(<%ConfData%>);
    </script>
    <% end if
COMObject.Sleep 500 'sleep 0.5 sec
Next%>
```

This script operates to enter a loop that will execute LoopLength times. For each pass through the loop, the COM application 415 is called to determine if the conference data has been updated and to obtain the updated conference data (515). The update conference data will be returned the variable ConfData (or ConfData may be a pointer to the conference data). If no new conference data is available, the server script will invoke a delay prior to returning to the beginning of the loop (540). However, if the conference data has been updated (520), then the client script (shown above in italics) is built within the Smart Page 410 in accordance with the new conference data (525). The client script is then loaded into the client computer device 320 (530). When the client script is fully loaded into the invisible pane 440 of the client computer device 325, the browser running on the client computer device 325 executes the client script. As a result of executing the client script, the visible pane 425 of the monitoring page 450 is updated with the new conference data (535). Finally, prior to ending this pass of the loop, the delay is performed (540). Thus, all the processing of the server script is performed within the web server 310 unless and until new conference data is available. At this time, the client computer device 325 will operate to update the visible pane 435 to reflect the new conference data.

If instead, the server script were constructed as follows:

```
<script LANGUAGE="JavaScript">
<%LoopLength =120
    For j = 0 to LoopLength
    ret=COMObject.GetConfData(ConfData)
    if ret=1 then 'there is new data%>
        UpdateTheViewedPage(<%ConfData%>);
    <%end if
COMObject.Sleep 500 'sleep 0.5 sec
Next%>
</script>
``` then the client script would have been downloaded only after finishing the loop. Therefore, the monitoring web page 450 would be updated only once a minute (depending on the "LoopLength" value) rather than once every 0.5 seconds.

Although the loop is referred to as an endless loop, in reality, the loop is not endless as shown in the above example. Instead, the loop should be structured to run for a certain period of time. In application, the certain period of time should, for all practical purposes, appear to be endless in comparison to the execution time of the loop. In an exemplary embodiment of the present invention, the endless loop takes approximately one minute; however, those skilled in the art will appreciate that the present invention could be implemented using a variety of loop lengths. Limiting the loop to a finite number of cycles, 120, prevents a situation in which the website locks up.

To renew the loop for continued monitoring of the conference, the Smart Page has to be reloaded (or refreshed).

For example, the following Java Script can be added at the end of the Smart Page:

```
this.document.location.href="SmartPage.asp".
```

Figure 5:
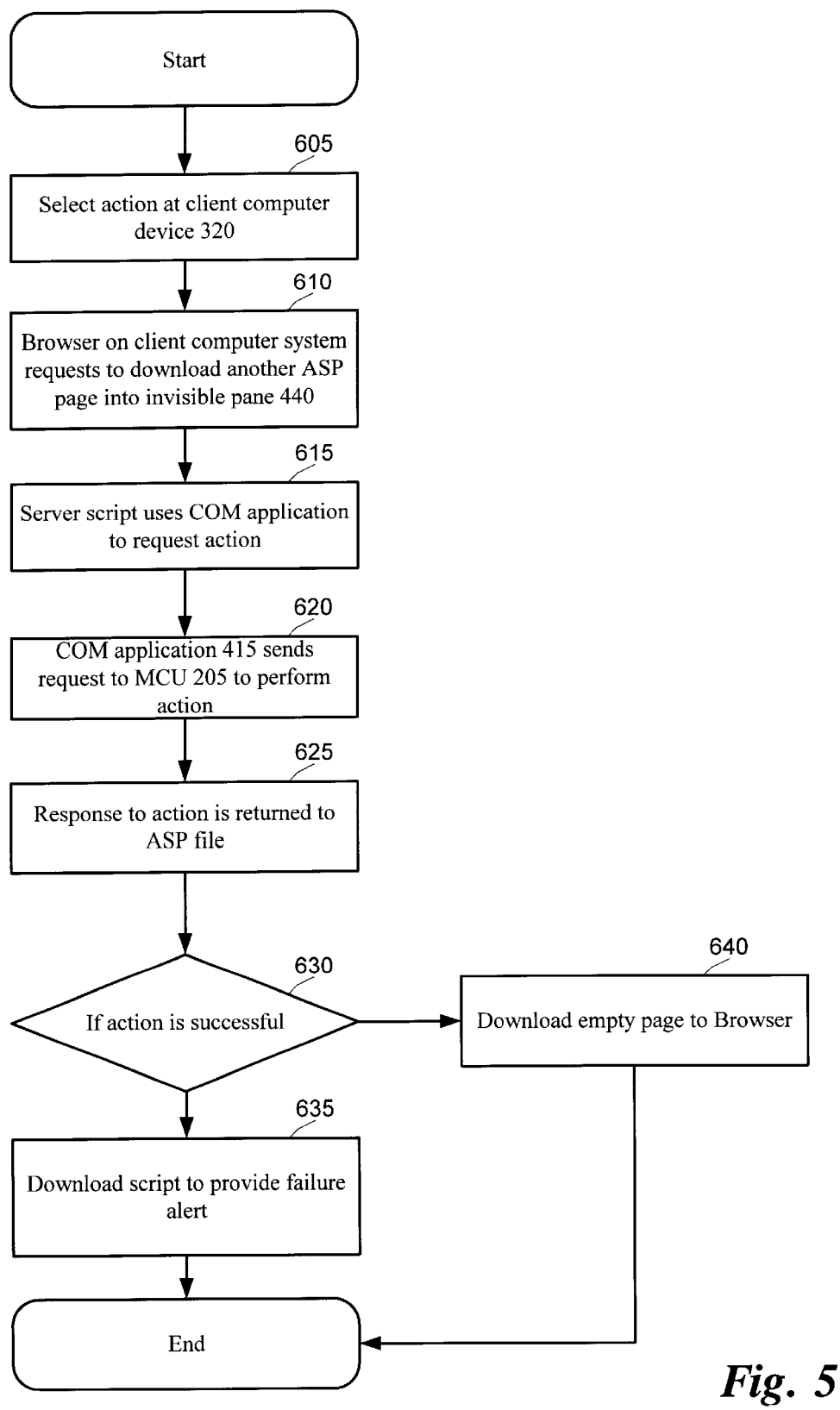
FIG. 5 is a flow diagram illustrating the operation of controlling a video conference event using an exemplary embodiment of the present invention.

FIG. 5 is a flow diagram illustrating the steps of an exemplary embodiment of the present invention for controlling a video conference event that is being monitored in accordance with FIG. 4. The operation of this exemplary embodiment of the present invention to control a video conference event is illustrated by using one example application—muting a client terminal 230 using the monitoring web page.

The visible pane 435 of the monitoring web page 450 is displayed on the client computer device 230 of participant A. In an exemplary embodiment, the visible pane 435 may include one or more action buttons (i.e., a mute button). When participant A activates an action button (605), the browser operating on the client computer device 320 requests the web server 310 to download another ASP page into another invisible pane 440 of the client computer device 320 (610). Before downloading the ASP page, the server script in the page running on the web server 310 uses the COM interface to request the COM application 415 to mute the client terminal 235 of participant A (615). The COM application 415 sends the request to the MCU 205 (620). The success of the request is returned to the ASP file (625). If the operation fails (630), the ASP file downloads a client script to the client computer device 235 to alert of the failure (635). Otherwise, an empty page is downloaded to the client computer device 230 (640).

When the user wants to stop monitoring the conference (for example by clicking a link to another page), an alternate page has to be loaded instead of the Smart Page. This process will stop the endless reloading of the Smart Page.

The website should be separated into two sites in the IIS. The dual paned monitoring web page 450, the viewed pane 435 and other pages on the website should reside on one logical site, and the Smart Page on another logical site. This ensures the responsiveness of the website and enables the termination of the reloading loop. From the users point of view, this looks like one website with one URL but, in actuality, it is two web pages that are accessed using a single URL. The logical site with the Smart Page 410 should be configured in the IIS without buffering (usually this is the default).

By default the IIS server is configured in such a way that only 10 loops can run in parallel, so that when the eleventh participant enters the monitoring website, the participant will not be updated until one of the other ten finishes the loop in the Smart Page. To alleviate this problem, a parameter has to be added in the server registry. The parameter "ProcessorThreadMax" should be added to the key: HKEY_LOCAL_MACHINE\SYSTEM\CurrentControlSet\Services\W3SVC\ASP\Param etes The value should be set to the number of users that will enter the conference control page simultaneously. In Windows 2000 Server this limitation is a lot higher.

Definitions

Throughout this specification, the following terms are attributed with the following definitions:

"COM" is a Microsoft Component Object Model;

"URL" is Universal Resource Locator;

"MCU" is a Multipoint Control Unit;

"ASP" is a Microsoft Active Server Page;

"HTTP" is the Hyper Text Transfer Protocol;

"IIS" is a Microsoft Internet Information Server;

"HTML" is the Hyper Text Markup Language;

"GUI" is a Graphical User Interface; and

"GIF" is a Graphics Interchange Formatted object.

CONCLUSION

The present invention provides the ability to monitor and control a video conference, or other event, through a website. Rapidly changing data is provided to a client computer device by utilizing a looped server script having an embedded client script. The server script operates to identify and obtain updated information. The server script then modifies the client script based on the updated information. The modified client script is then downloaded to the client computer system to be executed. Upon execution, the client script updates the display of the client computer device. Thus, updated information is received and displayed by the client computer device without requiring the client computer device to directly monitor the event, or load extraneous information. As a result, a rapidly updated website is obtained that efficiently utilizes time and bandwidth. The present invention has been described in relation to particular embodiments which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. A system for controlling the operation of a conference via a network, the conference being provided by a conference system that includes a conference system controller, the system comprising:

a web server including a conference system controller interface to provide control information to the conference system controller and a network interface;

a client computer device having a display and being communicatively connected to the web server through the network interface; and a web browser running on the client computer device and being operative to receive a monitoring web page from the web server, the monitoring web page defining at least one control element which when actuated causes the web browser to request the web server to send a control action to the conference system controller over the conference system controller interface, the control action being associated with the actuated control element, wherein web server includes a COM application and the web browser requests the web server to send a control action to the conference system controller by requesting the download of a command ASP page from the web server, the command ASP page including a server script with a call to the COM application, and the COM application, in response to receiving the call from the server script being operative to interface to the conference system controller over the conference system controller interface.

2. A system for controlling the operation of a conference via a network, the conference being provided by a conference system that includes a conference system controller, the system comprising:

a web server including a conference system controller interface to provide control information to the conference system controller and a network interface;

a client computer device having a display and being communicatively connected to the web server through the network interface; and a web browser running on the client computer device and being operative to receive a monitoring web page from the web server, the monitoring web page defining at least one control element which when actuated causes the web browser to request the web server to send a control action to the conference system controller over the conference system controller interface, the control action being associated with the actuated control element, wherein the monitoring web page from the web server defines a visible pane and an invisible pane, the visible pane receiving content from a first site and the invisible pane receiving content from a second site, whereby using different sites the operator can interact with the visible pane during operation.

3. The system of claim 2, wherein the monitoring web page automatically monitors the conference for conference information and upon a detection of a change in the conference information down loads script to the web browser that updates only aspects displayed by the web browser related to the change.

4. The system of claim 2, wherein the network is the Internet.

5. The system of claim 2, wherein the communication between the web server and the client computer is based on HTTP protocol.

6. The system of claim 2, wherein the display is updated without the client manually sending a refresh request to the web server.

7. A system for monitoring the status of a conference via a network, the conference being provisioned by a conferencing system that includes a conference system controller, the system comprising:

a web server including a conference system controller interface to receive status information from the conference system controller, and a network interface;

a client computer device having a display and being communicatively connected to the web server through the network interface;

a looped server script running on the web server, the server script being operative to receive status information from conference system controller interface and when the status information is new, to generate a client script based, at least in part, on the status information, and download the client script to the client computer device; and a web browser running on the client computer device and enabling the client computer device to interfere with the web server via the network interface, the web browser being operative to receive the client script from the web server and run the client script, whereby the display of the client computer device is updated to display the status information.

8. The system of claim 7, wherein the web server includes a COM application and the server script is operative to receive status information from the conference system controller in response to placing a call to the COM application.

9. The system of claim 7, wherein the web browser running on the client computer device, in response to receiving a particular URL, downloads a monitoring web page from the web server, the monitoring web page defining a visible pane and an invisible pane.

10. The system of claim 7, wherein the web browser running on the client computer device, in response to receiving a particular URL, downloads a monitoring web page from the web server, the monitoring web page defining a visible pane and an invisible pane, the invisible pane receiving the client script, the visible pane being visible on the display of the client computing device and being updated when the client script is run.

11. The system of claim 7, wherein the network is selected from a group consisting of the Internet and intranet.

12. The system of claim 7, wherein the web server includes a COM application and the client computer device includes a control interface and, in response to receiving a control command on the control interface of the client computer device, the web browser requests the download of a command web page, the command web page including a command server script which when executed, places a call to a COM application running on the web server, the COM application being operative to perform the control command.

13. The system of claim 12, wherein if the COM application is successful to perform the control command, an empty web page is downloaded to the client computer device.

14. The system of claim 12, wherein if the COM application is not successful to perform the control command, an error web page is downloaded to the client computer device.

15. The system of claim 7, wherein the web browser via the looped script of the web server automatically monitors the conference for conference information and upon a detection of a change in the conference information down loads script to the web browser that updates only aspects displayed by the web browser related to the change.

16. The system of claim 7, wherein the network is the Internet.

17. The system of claim 7, wherein the communication between the web server and the client computer is based on HTTP protocol.

18. The system of claim 7, wherein the display is updated without the client manually sending a refresh request to the web server.

19. A system for monitoring the status of a conference via a network, the conference being provisioned by a conferencing system that includes a conference system controller, the system comprising:

a web server having a split web page comprising a visible pane and an invisible pane, the web server including a conference system controller interface to receive status information from the conference system controller and a network interface;

a client computer device having a display and being communicatively connected to the web server through the network interface, the client computer being operative to request an initial download of the split web page and to continually receive updated information from the split web page; and a looped server script running on the web server in the invisible pane, the server script being operative to request and receive status information from the conference system controller interface and when the status information is new, to generate a client script based, at least in part, on the new status information, and automatically download the client script to the invisible pane of the split web page in the client computer device; and a web browser running on the client computer device and enabling the client computer device to interface with the web server via the network interface, the web browser being operative to receive the client script from the web server and run the client script, wherein the display of the client computer device is updated to display the new status information.

* * * * *

UNITED STATES PATENT AND TRADEMARK OFFICE
CERTIFICATE OF CORRECTION

PATENT NO. : 6,760,750 B1
DATED : July 6, 2004
INVENTOR(S) : Rami Y. Boneh et al.

It is certified that error appears in the above-identified patent and that said Letters Patent is hereby corrected as shown below:

Column 1,
Line 51, replace "interfere" with -- interface --.

Signed and Sealed this

Sixth Day of September, 2005

JON W. DUDAS
*Director of the United States Patent and Trademark Office*